(12) United States Patent
Bertin et al.

(10) Patent No.: US 8,659,940 B2
(45) Date of Patent: Feb. 25, 2014

(54) CARBON NANOTUBE-BASED NEURAL NETWORKS AND METHODS OF MAKING AND USING SAME

(75) Inventors: Claude L. Bertin, Venice, FL (US); Brent M. Segal, Woburn, MA (US); Darren K. Brock, Woburn, MA (US)

(73) Assignee: Nantero Inc., Woburn, MA (US)

( * ) Notice: Subject to any disclaimer, the term of this patent is extended or adjusted under 35 U.S.C. 154(b) by 344 days.

(21) Appl. No.: 12/934,545

(22) PCT Filed: Mar. 25, 2009

(86) PCT No.: PCT/US2009/038265
§ 371 (c)(1),
(2), (4) Date: Mar. 24, 2011

(87) PCT Pub. No.: WO2010/008624
PCT Pub. Date: Jan. 21, 2010

(65) Prior Publication Data
US 2011/0176359 A1    Jul. 21, 2011

Related U.S. Application Data

(60) Provisional application No. 60/039,204, filed on Mar. 25, 2008.

(51) Int. Cl.
*G11C 11/54* (2006.01)
(52) U.S. Cl.
USPC ........... 365/167; 365/151; 365/148; 977/742; 977/940
(58) Field of Classification Search
USPC .......... 365/167, 151, 152, 148; 977/940, 742, 977/754, 750, 752, 943
See application file for complete search history.

(56) References Cited

U.S. PATENT DOCUMENTS

| | | | |
|---|---|---|---|
| 3,273,125 | A | 9/1966 | Jakowatz |
| 5,028,810 | A | 7/1991 | Castro et al. |
| 5,087,826 | A | 2/1992 | Holler et al. |
| 5,235,672 | A | 8/1993 | Carson |
| 5,293,457 | A | 3/1994 | Arima et al. |
| 5,696,883 | A | 12/1997 | Arima |
| 6,177,807 | B1 | 1/2001 | Bertin et al. |
| 6,422,450 | B1 | 7/2002 | Zhou et al. |
| 6,423,583 | B1 | 7/2002 | Avrouris |
| 6,496,037 | B1 | 12/2002 | Bertin et al. |
| 6,528,020 | B1 | 3/2003 | Dai |
| 6,808,746 | B1 | 10/2004 | Dai et al. |
| 6,888,773 | B2 | 5/2005 | Morimoto |
| 6,890,780 | B2 | 5/2005 | Lee |
| 6,894,359 | B2 | 5/2005 | Bradley et al. |

(Continued)

OTHER PUBLICATIONS

Avouris, et al., "Carbon Nanotube Electronics," Chemical Physics, vol. 281, 2002, pp. 429-445.

(Continued)

*Primary Examiner* — Son Dinh
(74) *Attorney, Agent, or Firm* — Nantero Inc.

(57) ABSTRACT

Physical neural networks based nanotechnology include dendrite circuits that comprise non-volatile nanotube switches. A first terminal of the non-volatile nanotube switches is able to receive an electrical signal and a second terminal of the non-volatile nanotube switches is coupled to a common node that sums any electrical signals at the first terminals of the nanotube switches. The neural networks further includes transfer circuits to propagate the electrical signal, synapse circuits, and axon circuits.

19 Claims, 15 Drawing Sheets

(56) References Cited

U.S. PATENT DOCUMENTS

| | | | |
|---|---|---|---|
| 6,899,945 B2 | 5/2005 | Smalley et al. | |
| 6,905,892 B2 | 6/2005 | Esmark et al. | |
| 6,918,284 B2 | 7/2005 | Snow | |
| 6,919,740 B2 | 7/2005 | Snider | |
| 6,921,575 B2 | 7/2005 | Horiuchi et al. | |
| 7,015,500 B2 | 3/2006 | Choi et al. | |
| 7,047,225 B2 | 5/2006 | Poon | |
| 7,161,403 B2 | 1/2007 | Bertin | |
| 7,294,877 B2 | 11/2007 | Rueckes et al. | |
| 7,781,862 B2 | 8/2010 | Bertin | |
| 7,782,650 B2 | 8/2010 | Bertin | |
| 7,835,170 B2 | 11/2010 | Bertin | |
| 2002/0175390 A1 | 11/2002 | Goldstein et al. | |
| 2004/0031975 A1 | 2/2004 | Kern | |
| 2004/0132070 A1 | 7/2004 | Star et al. | |
| 2004/0266106 A1 | 12/2004 | Lee | |
| 2005/0212014 A1 | 9/2005 | Horibe et al. | |
| 2006/0061389 A1 | 3/2006 | Bertin | |
| 2006/0250843 A1 | 11/2006 | Bertin et al. | |
| 2006/0250856 A1 | 11/2006 | Bertin et al. | |
| 2006/0258122 A1 | 11/2006 | Whitefield et al. | |
| 2006/0264053 A1 | 11/2006 | Yates | |
| 2006/0281256 A1 | 12/2006 | Carter et al. | |
| 2006/0281287 A1 | 12/2006 | Yates et al. | |
| 2006/0292716 A1 | 12/2006 | Gu et al. | |
| 2008/0157126 A1 | 7/2008 | Bertin et al. | |
| 2008/0157127 A1 | 7/2008 | Bertin et al. | |
| 2008/0158936 A1 | 7/2008 | Bertin et al. | |
| 2008/0159042 A1 | 7/2008 | Bertin et al. | |
| 2008/0160734 A1 | 7/2008 | Bertin et al. | |
| 2008/0170429 A1 | 7/2008 | Bertin et al. | |
| 2010/0147657 A1* | 6/2010 | Sen et al. | 200/181 |
| 2010/0283528 A1* | 11/2010 | Rueckes et al. | 327/427 |

OTHER PUBLICATIONS

Awano, Y., "Graphene for VLSI: FET and Interconnect Applications," IEDM 2009 Technical Digest, pp. 10.1.1-10.1.4.

Brown, K.M., "System in package "The Rebirth of SIP"," 2004 IEEE Custom Integrated Circuits Conference, May 2004, 6 pages.

Collins, et al., "Engineering Carbon Nanotubes and Nanotube Circuits Using Electrical Breakdown," Science, vol. 292, Apr. 2001, pp. 706-709.

Crowley, et al., "512 Mb PROM with 8 layers of antifuse/Diode cells," IEEE International Solid-State Circuits Conference, vol. XLVI, Feb. 2004, 24 pages.

Cui, et al., "Carbon Nanotube Memory Devices of High Charge Storage Stability," Applied Physics Letters, vol. 81, No. 17, Oct. 2002, pp. 3260-3262.

Derycke, et al., "Carbon Nanotube Inter- and Intramolecular Logic Gates," Nano Letters, vol. 1, No. 9, Sep. 2001, pp. 453-456.

Elias, "Artificial Dendritic Trees, Neural Computation," vol. 5, pp. 648-663 [online], 1993 [retrieved on Dec. 9, 2009], Retrieved from the Internet:<URL:http://www.ece.udel.edu/-elias/neuromorphicSystems/data/Components/ps3.pdf>.

Fuhrer, et al., "High-Mobility Nanotube Transistor Memory," Nano Letters, vol. 2, No. 7, 2002, pp. 755-759.

Hone, J., "Phonons and Thermal Properties of Carbon Nanotubes," Carbon Nanotubes, Topics Appl. Phys. 80, 2001, pp. 273-286.

Huai, Y., "Spin-Transfet Torque MRAM (STT-MTAM): Challenges and Prospects," AAPS Bulletin, vol. 18, No. 6, Dec. 2008, pp. 33-40.

International Search Report, International Application No. PCT/US09/38265 dated Feb. 25, 2010, 2 pages.

Jiang, et al., "Performance Breakthrough in 8nm Gate-All-Around Length Gate-All-Around Nanowire Transistors using Metallic Nanowire Contacts," 2008 Symposium on VLSI Technology Digest of Technical Papers, pp. 34-35.

Johnson, R.C., "IBM fellow unrolls blueprint for nano," EE Times, Mar. 2006, 3 pages, Internet:<URL:[http://www.eetimes.com/showArticle.jhtml?,ArticleID=181500934].

Kianian, et al., "A 3D Stackable Carbon Nanotube-based Nonvolatile Memory (NRAM)," ISSDERC, Jun. 14, 2010, Nantero, Inc., 4 pages.

Kong, et al., "Quantum Interference and Ballistic Transmission in Nanotube Electron Waveguides," Physical Review Letters, vol. 87 No. 10, Sep. 2001, pp. 106801-1-106801-4.

Langer, et al., "Electrical Resistance of a Carbon Nanotube Bundle," J. Mater. Res., vol. 9, No. 4, Apr. 1994, pp. 927-932.

Ma, "Global Reinforcement Training of CrossNets," Dissertation [online], Dec. 2007 [retrieved on Dec. 9, 2009], Retrieved from the Internet:<URL:http://dspace.sunyconnect.suny.edu/bistream/1951/44831/1/04623709.sbu.pdf>.

Novak, et al., "Nerve Agent Detection Using Networks of Single-Walled Nanotubes," Applied Physics Letters, vol. 83, No. 19, Nov. 2003, pp. 4026-4028.

Onoa, et al., "Bulk Production of Singly Dispersed Carbon Nanotubes with Prescribed Lengths," Nanotechnology 16, 2005, pp. 2799-2803.

Rueckes, et al., "Carbon Nanotube-Based Nonvolatile Random Access Memory for Molecular Computing," Science, vol. 289, Jul. 2000, pp. 94-97.

Servalli, G., "A 45nm Generation Phase Change Memory Technology," IEDM 2009 Technical Digest, pp. 5.7.1-5.7.4.

Snow, et al., "Random Networks of Carbon Nanotubes as an Electronic Material," Applied Physical Letters, vol. 82, No. 13, Mar. 2003, pp. 2145-2147.

Star, et al., "Nanoelectronic Carbon Dioxide Sensors," Adv. Mater., vol. 16, No. 22, Nov. 2004, pp. 2049-2052.

Star, et al., "Nanotube Optoelectronic Memory Devices," Nano Letters, vol. 4, No. 9, 2004, pp. 1587-1591.

Zhou, et al., "p-Channel, n-Channel Thin Film Transistors and p-n Diodes Based on Single Wall Carbon Nanotube Networks," Nano Letters, vol. 4, No. 10, 2004, pp. 2031-2035.

Brock, et al., "Carbon Nonvolatile Memories and Fabrics in a Radiation Hard Semiconductor Foundry," 2005 IEEE Conference, 9 pages.

Rueckes, et al., "Carbon Nanotube-Based Nonvolatile Random Access Memory for Molecular Computing," Science, 2000, vol. 289. pp. 94-97.

Ward, et al., "A Non-Volatile Nanoelectromechanical Memory Element Utilizing a Fabric of Carbon Nanotubes," IEEE 2004, pp. 34-38.

* cited by examiner

BIOLOGICAL NEURON 100

Pulse Control Examples 1200

Pulse Directionality Control

Pulse Polarity Control

Pulse Amplitude Control

Pulse Temporal Control

US 8,659,940 B2

CARBON NANOTUBE-BASED NEURAL NETWORKS AND METHODS OF MAKING AND USING SAME

CROSS REFERENCE TO RELATED APPLICATIONS

This application is a U.S. national phase application under 35 U.S.C. §371 of International Patent Application No. PCT/US2009/038265 filed on Mar. 25, 2009, entitled CARBON NANOTUBE-BASED NEURAL NETWORKS AND METHODS OF MAKING AND USING SAME, which claims priority under 35 U.S.C. §119(e) to U.S. Provisional Patent Application No. 61/039,204, filed on Mar. 25, 2008, entitled CARBON NANOTUBE-BASED NEURAL NETWORKS AND METHODS OF MAKING AND USING SAME, the contents of each are incorporated herein in their entirety by reference.

This application is related to the following applications, the entire contents of which are incorporated herein by reference in their entirety:

- U.S. patent application Ser. No. 11/280,786, filed 15 Nov. 2005, entitled TWO-TERMINAL NANOTUBE DEVICES AND SYSTEMS AND METHODS OF MAKING SAME;
- U.S. patent application Ser. No. 11/835,583, filed 8 Aug. 2006, entitled LATCH CIRCUITS AND OPERATION CIRCUITS HAVING SCALABLE NONVOLATILE NANOTUBE SWITCHES AS ELECTRONIC FUSE REPLACEMENT ELEMENTS;
- U.S. patent application Ser. No. 11/835,612, filed 8 Aug. 2006, entitled NONVOLATILE RESISTIVE MEMORIES HAVING SCALABLE TWO-TERMINAL NANOTUBE SWITCHES;
- U.S. patent application Ser. No. 11/835,651, filed 8 Aug. 2006, entitled NONVOLATILE NANOTUBE DIODES AND NONVOLATILE NANOTUBE BLOCKS AND SYSTEMS USING SAME AND METHODS OF MAKING SAME;
- U.S. patent application Ser. No. 11/835,759, filed 8 Aug. 2006, entitled NONVOLATILE NANOTUBE DIODES AND NONVOLATILE NANOTUBE BLOCKS AND SYSTEMS USING SAME AND METHODS OF MAKING SAME;
- U.S. patent application Ser. No. 11/835,845, filed 8 Aug. 2006, entitled NONVOLATILE NANOTUBE DIODES AND NONVOLATILE NANOTUBE BLOCKS AND SYSTEMS USING SAME AND METHODS OF MAKING SAME;
- U.S. patent application Ser. No. 11/835,852, filed 8 Aug. 2006, entitled NONVOLATILE NANOTUBE DIODES AND NONVOLATILE NANOTUBE BLOCKS AND SYSTEMS USING SAME AND METHODS OF MAKING SAME;
- U.S. patent application Ser. No. 11/835,856, filed 8 Aug. 2006, entitled NONVOLATILE NANOTUBE DIODES AND NONVOLATILE NANOTUBE BLOCKS AND SYSTEMS USING SAME AND METHODS OF MAKING SAME;
- U.S. patent application Ser. No. 11/835,865, filed 8 Aug. 2006, entitled NONVOLATILE NANOTUBE DIODES AND NONVOLATILE NANOTUBE BLOCKS AND SYSTEMS USING SAME AND METHODS OF MAKING SAME; and
- U.S. patent application Ser. No. 11/835,613, filed 8 Aug. 2006, entitled MEMORY ELEMENTS AND CROSS POINT SWITCHES AND ARRAYS OF SAME USING NONVOLATILE NANOTUBE BLOCKS.

BACKGROUND

1. Technical Field

The present application relates generally to nanotube switches and methods of making same, and, more specifically, to carbon nanotube fabrics and methods of making same for use in information processing circuits and systems.

2. Discussion of Related Art

As CMOS technology is scaled to smaller dimensions with an ever increasing number of devices per chip (in the billions of transistors), the FET complexity is increasing, wiring complexity is increasing, and electronics is approaching quantum-mechanical boundaries. As a result, power dissipation is rapidly increasing. For example, at the 1 µm technology node, an Intel i486 microprocessor dissipated approximately 2 Watts/cm$^2$ but at the 0.18 µm technology node, the Intel Pentium III microprocessor dissipates approximately 70 Watts/cm$^2$, a 35× increase. Further scaling results in still higher power dissipation. What is needed is a way of improving electronic system function while reducing power dissipation.

Neurobiological systems reached a technology boundary long ago. The brain, for example, is far more efficient than any electronic device. The brain is based on water and electrolytes, is 3D, analog, complex, and dissipates very little power. Electronic circuits, made from sand, metal, and using 2D interconnections, have been shown to exhibit limited behavioral characteristics similar to neural network functions but none have made significant inroads in achieving efficient neural networks.

SUMMARY OF THE INVENTION

Nonvolatile nanotube switches enabling a new electronic implementation based on nanotube neural networks are disclosed. Systems of nanotube neural networks that use nanotube fabric switches and methods of making the same are disclosed.

DETAILED DESCRIPTION

Nonvolatile nanotube switches enable new electronic implementations based on nanotube neural networks. One solution to the complexity and performance limitations of traditional electronic devices is the use of carbon nanotubes to fashion agile information processing circuits in analogy with biological neural networks. Nanotube-based circuit and network functions exhibit some of the desirable characteristics found in biological neural networks. For NT Neural Networks, these characteristics include:

3D interconnections

High device density

Low power with nonvolatile nanotube switches

Low noise because of relatively slow operation

High fan-in compatibility via NT dendrite trees and high fan-out capability via NT axons Lowered cost, since there is no immediate need for very small technology nodes High reliability including tolerance to broad temperature ranges and high levels of radiation Nanotube based circuits and networks using switches and memory elements comprising nanotube fabrics are described in detail in the incorporated references. Specifically, nonvolatile nanotube switches are disclosed in NAN-96 (U.S. patent application Ser. No. 11/280,786, filed 15 Nov. 2005), NAN-109 (U.S. patent application Ser. Nos. 11/835,583 and 11/835,612, each filed 8 Aug. 2006), NAN-116 (U.S. patent application Ser. Nos. 11/835,651, 11/835,759, 11/835,845, 11/835,852, 11/835,856, 11/835,865, each filed 8 Aug. 2006) and NAN-117 (U.S. patent application Ser. No. 11/835,613, filed 8 Aug. 2006. Also, nanotube neural networks use an extension of the disclosure "Nonvolatile Nanotube Select Circuits" by Claude Bertin dated Feb. 14, 2008 and concepts in two D-NT 62 disclosures submitted in mid-2006 on Nanotube Neurons. NAN-109 includes concepts of NV NT multi-resistance programmable values (multiple-ON states) that enable NV NT switches to exhibit analog behavior. Also, these switches exhibit digital operation switching between high-resistance (GΩ-range) OFF states and low-resistance (100 kΩ range) ON states.

Figure 1A:
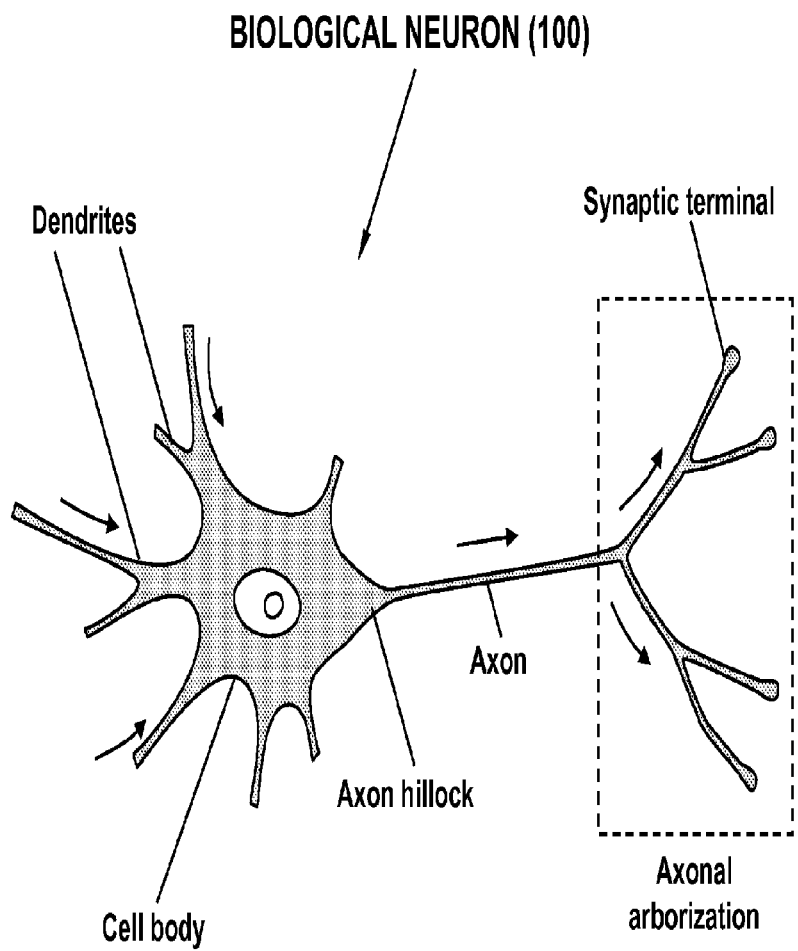
FIGS. 1A and 1B illustrate a biological neural cell or "neuron"
Figure 1B:
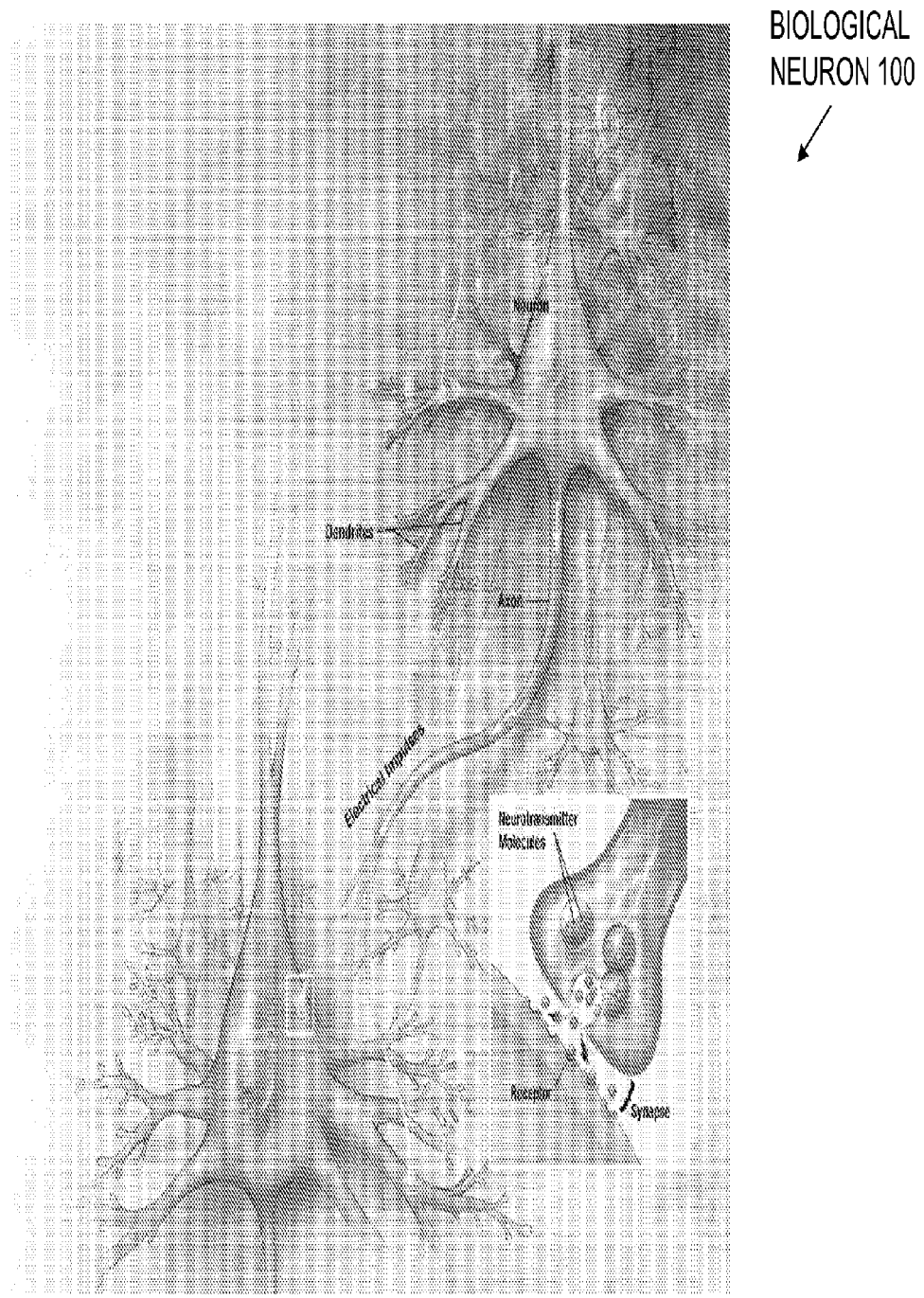

FIGS. 1A and 1B illustrate a biological neural cell or "neuron" 100 with key components labeled such as its dendrites axon, and synapses. Arrows indicate the direction of signal flow through the cell. Dendrites provide the neuron with its signal pickups. One or more received signals are processed in the cell body and communicated as a single signals along the axon where they are distributed to one or more synaptic terminals. Synapses are junctions between individual neurons where signal propagation is also modulated. Nanotube-based circuits playing the role of these various biological components are described below.

Figure 2:
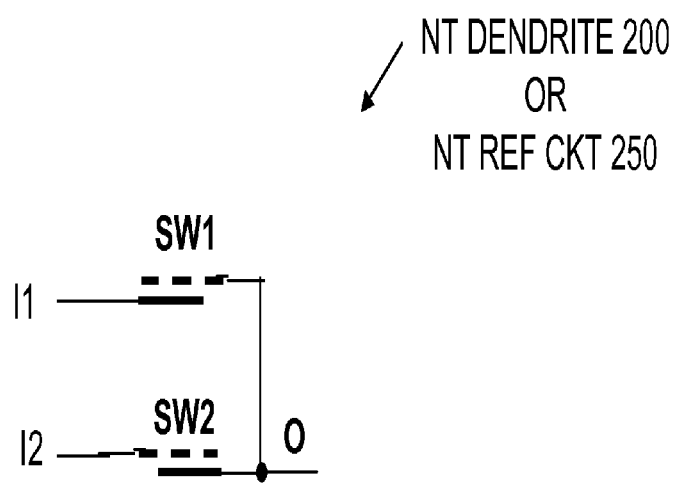
FIG. 2 illustrates a simple nanotube-based circuit, according to one embodiment.

FIG. 2 is a simple nanotube-based circuit that may be used as a NT Dendrite 200 or as a NT Reference Circuit 250. Switches SW1 and SW2 receive input I1 and input I2 respectively, while the opposing end of each two terminal switch is connected to a common node O which is the output of the circuit.

In operation, switches SW1 and SW2 respond to electrical signals that develop voltages across the switches allowing small currents to flow through them on the order of 100 nA to 10 uA for present generation switches. Present generation switches are typically fabricated at 0.18 μm to 0.25 μm technology nodes. For present generation switches, these developed voltages are less than 3 volts and typically do not modify the switch resistances. For voltages in, for instance, the 3 volt to 5 volt range, however, switches respond to signals (a) with relatively slow rise times (slower than 100 ns for example) and with (b) multiple excitations, by decreasing SW1 and/or SW2 resistances. Voltage pulses in the 5 volt to 8 volt range with faster rise time pulses (faster than 100 ns for example) result in increased resistance values for SW1 and/or SW2. Such resistance changes remain in effect until another set of electrical signals meeting the criteria above is applied, therefore this behavior qualifies the device as non-volatile. Buy utilizing this characteristic response to multiple excitations, the nonvolatile resistance values of switches SW1 and SW2 can change over time depending on how the NT dendrite is used.

Figure 3:
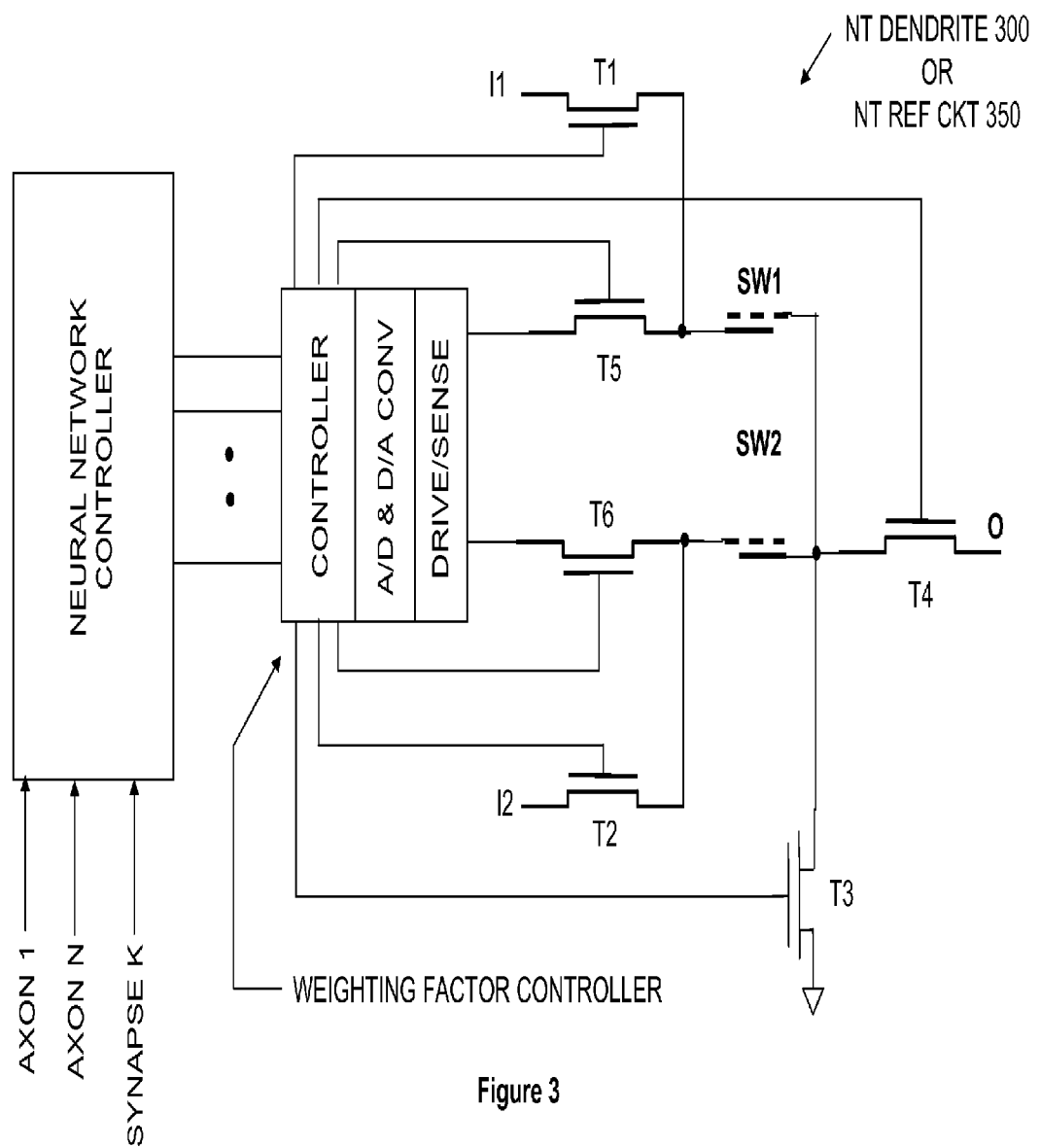
FIG. 3 illustrates a more complex nanotube-based circuit, according to another embodiment.

FIG. 3 is a more complex nanotube-based circuit that may be used as an NT Dendrite 300 or as an NT Reference Circuit 350. In this case, however, the resistances of SW1 and SW2 are deliberately set by monitoring the behavior of selected nodes within the circuit and feeding that information back to a Neural Network Controller.

There may be one overall Neural Network Controller or multiple Neural Network Controllers distributed throughout the NT Neural Network, depending on the particular embodiment. If input signals I1 and I2 are of sufficiently low voltage values that SW1 and SW2 resistance values are unaffected by the input signals, then the SW1 and SW2 resistance values can be set using a feedback mechanism that involves the Neural Network Controller function—that is the stimulation of NT Dendrites via NT Synapses based on the behavior multiple feedback signals as is illustrated further below.

In feedback operation (learning mode), the values of SW1 and SW2 are set by the Neural Network Controller function based on inputs from, for example, axon 1, axon n, and synapse k together with the Neural Network Controller algorithm and/or internal wiring configurations. Note that in this mode the output O of NT Dendrite 300 or NV REF CKT 350 is decoupled from switches SW1 and SW2 by transistor T4. Likewise, transistors T1 and T2 are turned OFF, decoupling SW1 and SW2 from inputs I1 and I2, respectively. Transistor T3 is turned ON connecting the commons SW1 and SW2 to a reference voltage such as ground. Transistors T5 and T6 are also turned ON providing the Neural Network Controller with access to sense and effect the SW1 and SW2 resistance values. This function employs the Weighting Factor Controller illustrated in FIG. 3.

The Weighting Factor Controller reads the value of SW1 and SW2 resistances using a drive/sense circuit, then converts the analog values to digital form using an A/D converter, and thus provides the values to the Neural Network Controller. The Neural Network Controller calculates new SW1 and SW2 resistance values, which can be considered as "weighting factors", and supplies these new resistance values to the Weighting Factor Controller which translates them into analog signals using a D/A converter. The drive/sense circuit sets SW1 and SW2 resistances to the new resistance values (i.e. sets the new weights) using these analog signals. Note that these analog signals may take the form of multiple excitation signals as required. Methods of controlling resistance values of NV NT switches are described in NAN-109 (U.S. patent application Ser. Nos. 11/835,583 and 11/835,612).

In normal operation, transistors T3, T5, and T6 are turned OFF and transistors T1, T2, and T4 are turned ON enabling standard NT Dendrite 300 operation or NT REF CKT 350 operation. Although the circuit here is described in terms of transistors, FETs created in semiconductor substrates, and/or thin-film FETs not in semiconductor substrates, CNT-FETs (NAN-82, 86), NT electromechanical switches—either volatile (NAN-31) or nonvolatile (NAN-45)—may also be used.

Figure 4:
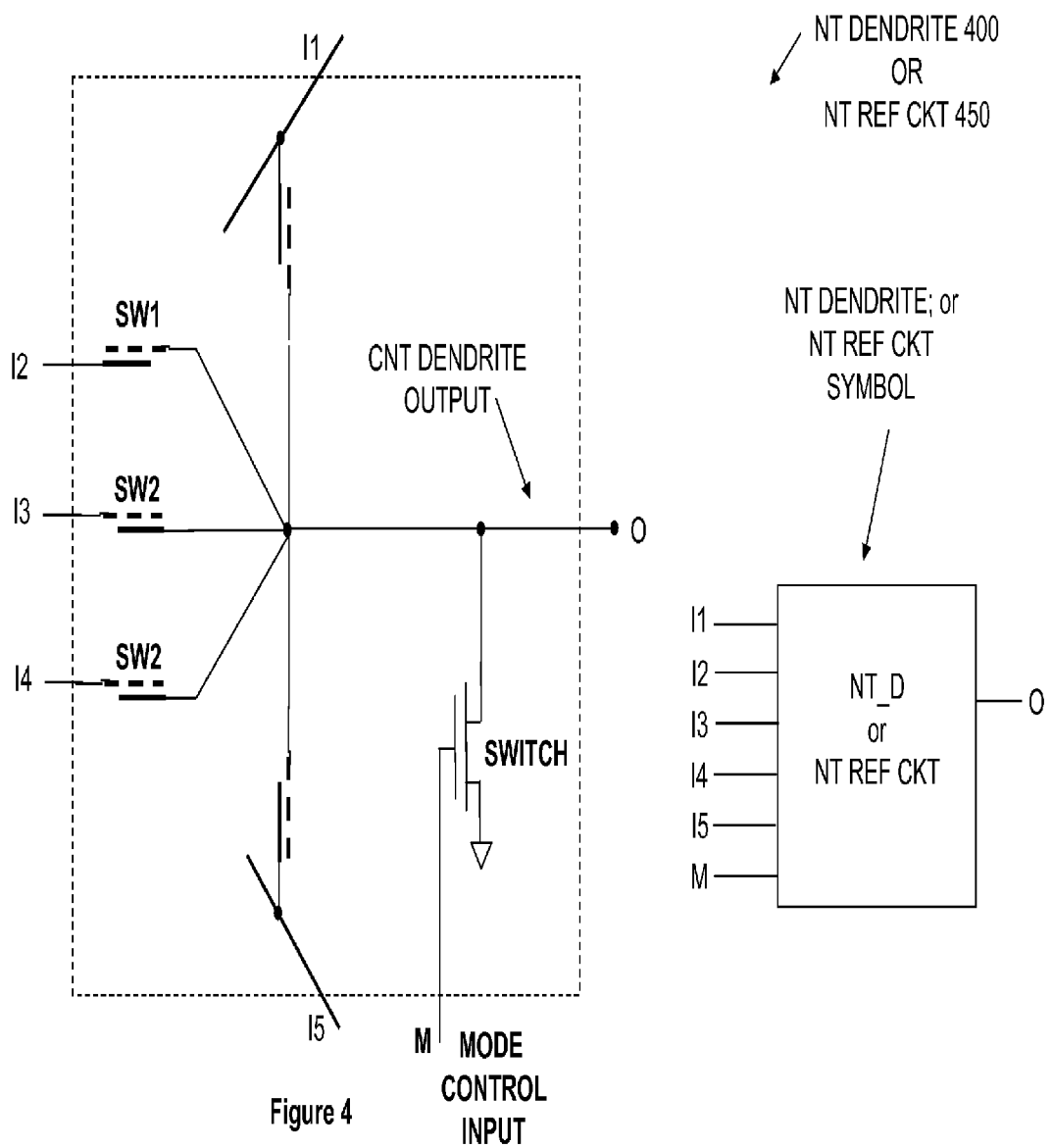
FIG. 4 illustrates a circuit with NT Dendrite 400 or NT REF CKT 450 with five inputs ($I_1$-$I_5$), according to another embodiment.

FIG. 4 shows NT Dendrite 400 or NT REF CKT 450 with five inputs ($I_1$-$I_5$). These inputs may be integrated on different physical wiring levels in a 3D wiring arrangement. A FET SWITCH is included in parallel with the output as well. SWITCH may be left OFF at all times resulting in a circuit operation similar to NT dendrite 200 or NT REF CKT 250. Alternatively, SWITCH may be turned ON allowing the NV NT switch resistance values to be set in an approach similar to that used with respect to NT Dendrite 300 or NT REF CKT 350. Returning SWITCH to the OFF position enables standard operation of the NT Dendrite 400 or NT REF CKT 450 according to the behavior of new NT NV Switch resistance values. The circuit is shown in schematic form with a corresponding symbolic representation.

Figure 5:
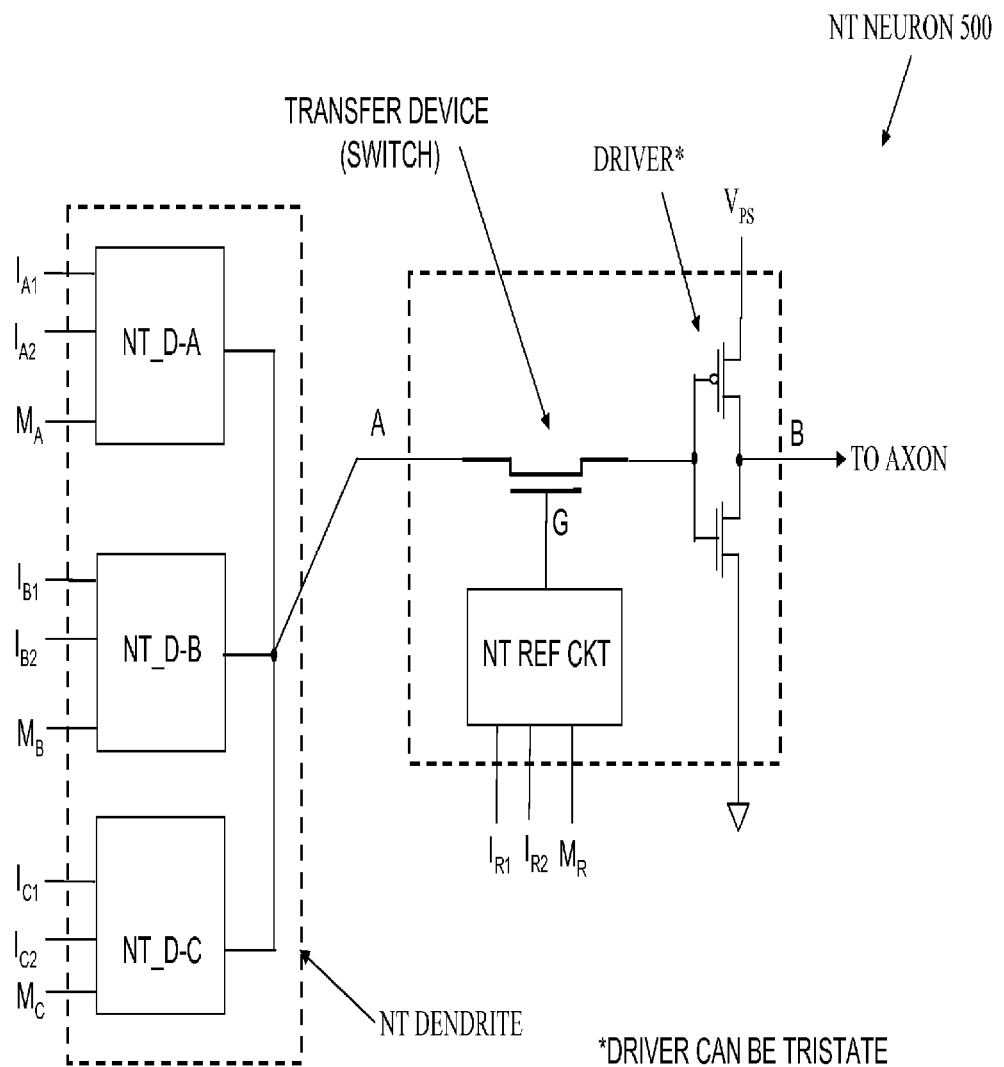
FIG. 5 illustrates a NT Neuron circuit according to another embodiment.

FIG. 5 illustrates NT Neuron 500. In this case three NT Dendrites, NT_D-A, NT_D-B, and NT_D-C, are shown. Each NT Dendrite may have any number of inputs (two are shown) and may also include a mode input M that determines whether the NT Dendrite is in standard operating mode or feedback mode (i.e. having NT NV Switch resistance values updated by a controller function similar to the FIG. 3 circuit). An NT REF CKT controls the voltage applied to the gate G of the Transfer Device (Switch).

In standard operation, node voltage A is determined by the applied input signals IA1, IA2, IB1, IB2, IB3, IC1, and IC2 along with NT NV Switch resistance values for each NT Dendrite. In FIG. 4, the NT NV Switches are inside the symbolic NT Dendrite blocks. If the NT REF CKT voltage applied to gate G is sufficiently high to activate the transfer device, then the signal voltage on node A is transmitted through the channel of the transfer device to the Driver and thus to output C which is connected to an NT Axon.

Figure 6:
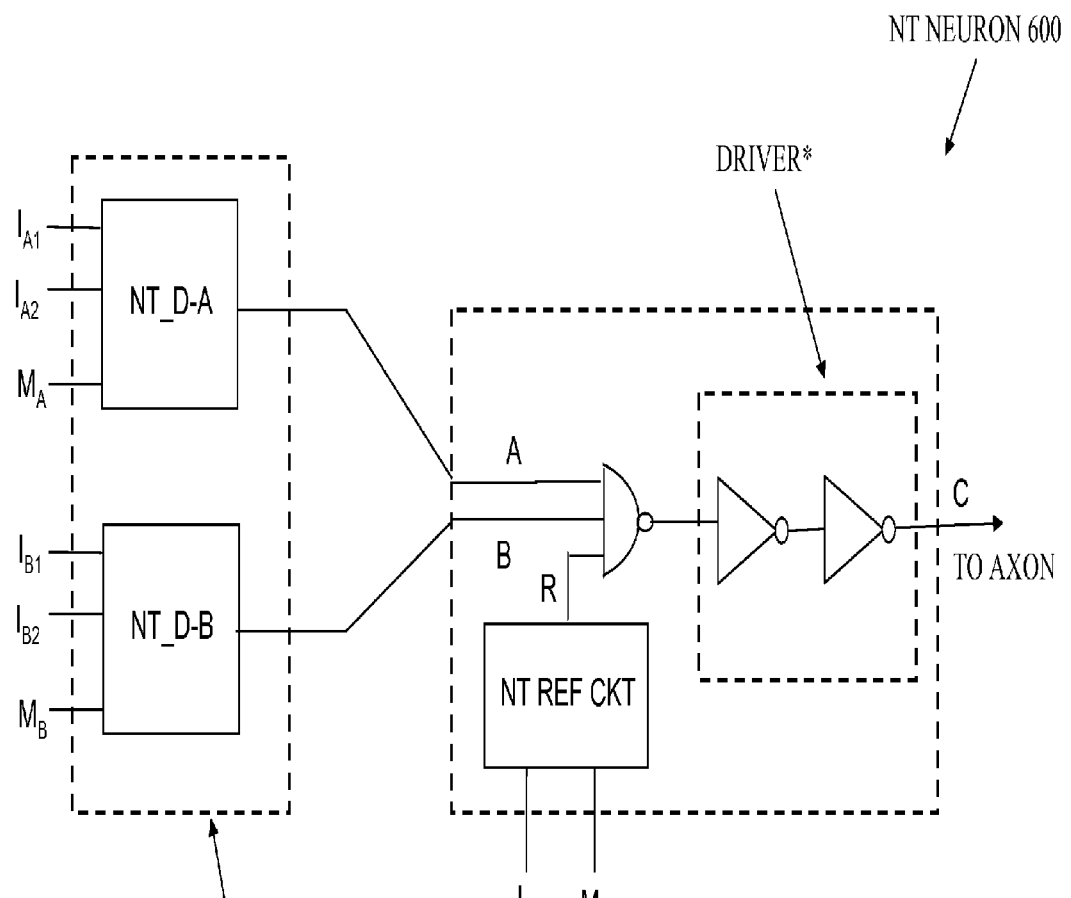
FIG. 6 illustrates a three-input NAND function used to form a NT Neuron circuit according to another embodiment.

FIG. 6 illustrates a three-input NAND function used to form the NT Neuron 600. NT Dendrites NT_D-A and NT_D-B provide signals to NAND gate inputs A and B, while the NT REF CKT provides a signal to NAND gate input R. If R is high, then the NAND gate output is the complement of the product of inputs A and B as indicated in the table NT Neuron Function. A Driver chain supplies this logic value to output C which is connected to an NT Axon.

Figure 7:
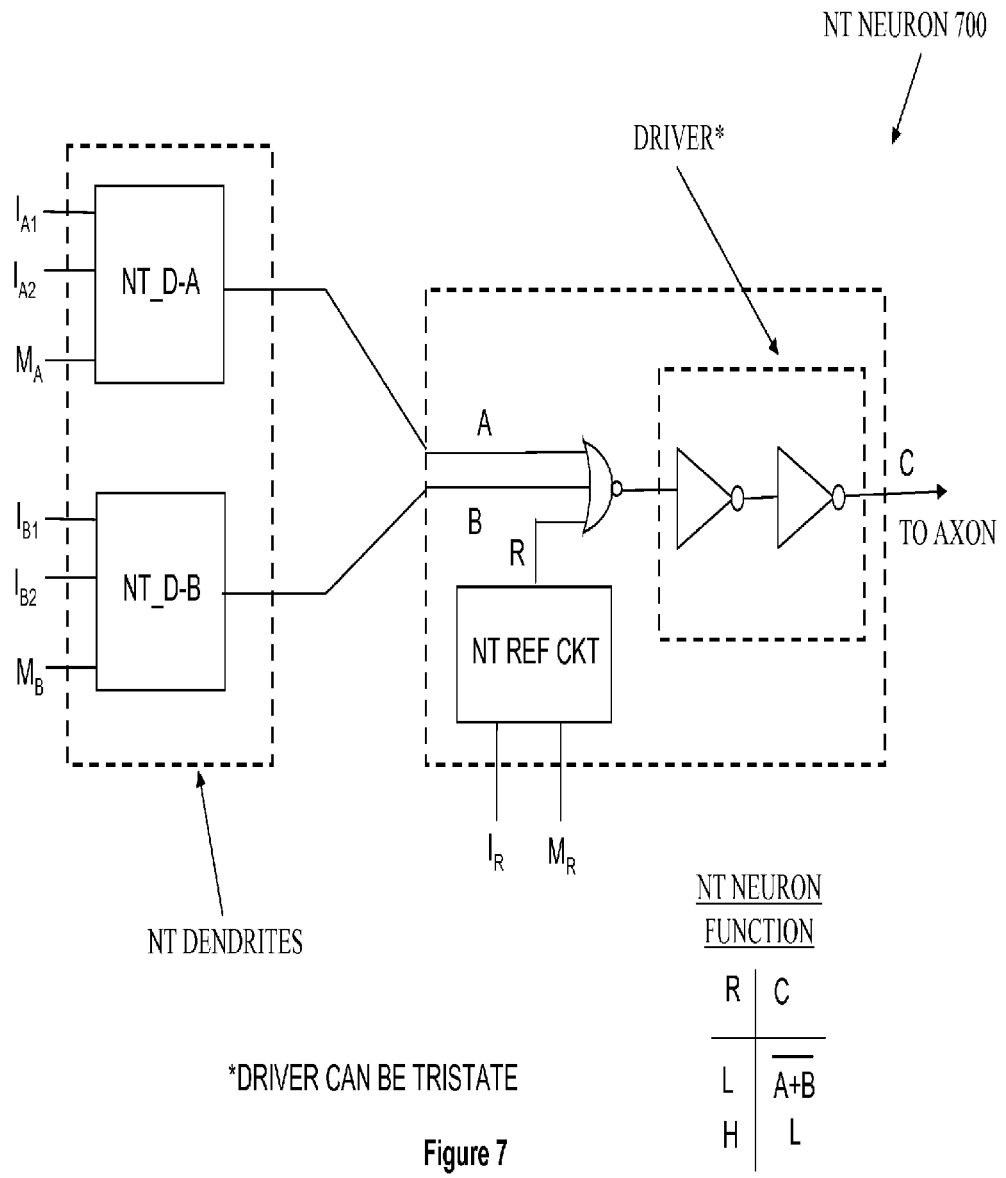
FIG. 7 illustrates a three-input NOR function used to form a NT Neuron circuit according to another embodiment.

FIG. 7 illustrates a three-input NOR function used to form the NT Neuron 700. NT Dendrites NT_D-A and NT_D-B provide signals to NOR gate inputs A and B. The NT REF CKT provides a signal to NOR gate input R. If R is low, then the output is the complement of the sum of inputs A and B as indicated in the table NT Neuron Function. A Driver chain supplies this logic value to output C which is connected to an NT Axon.

Figure 8:
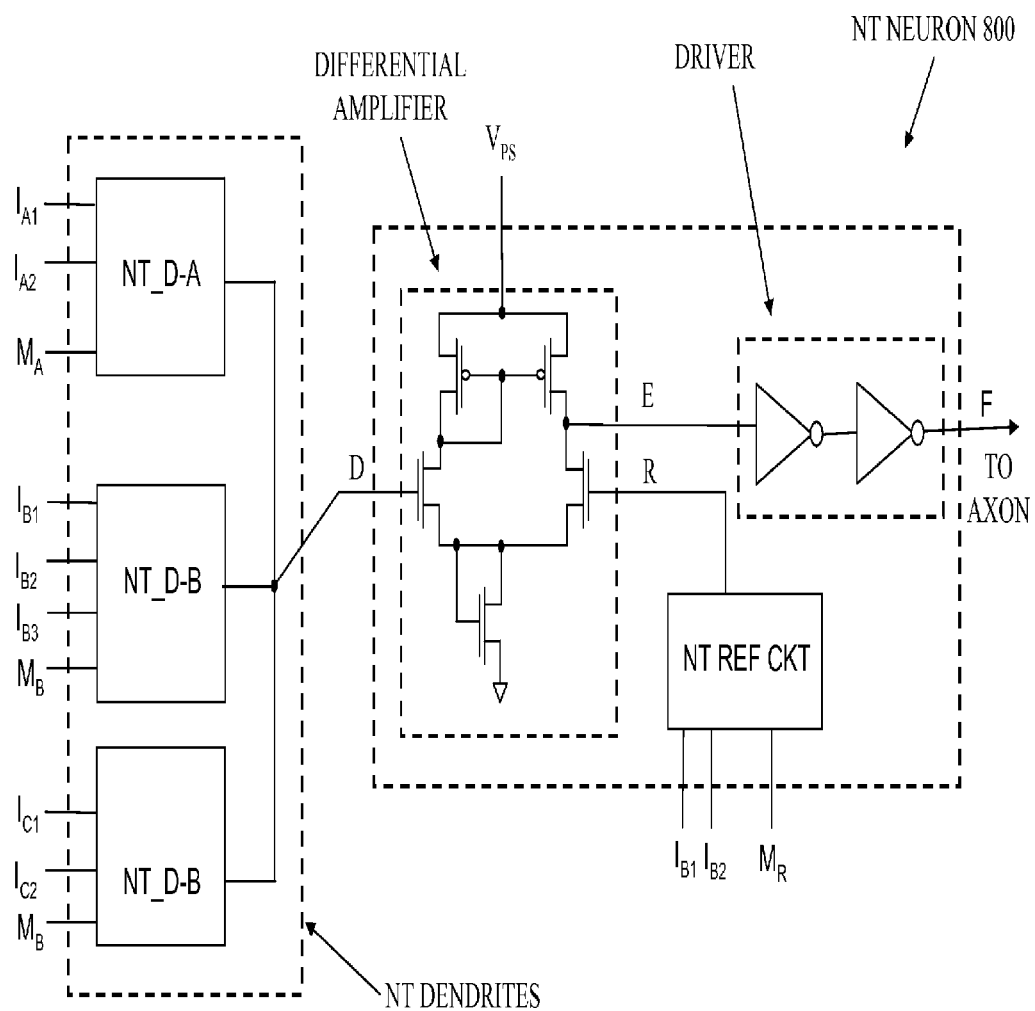
FIG. 8 illustrates a differential amplifier used to form a NT Neuron circuit according to another embodiment.

FIG. 8 illustrates a differential amplifier used to form the NT Neuron 800. In this case three NT Dendrites drive the input node D of the Differential Amplifier, while the NT REF CKT drives the Differential Amplifier reference node R. The difference in voltage between input node D and reference node R determines whether Differential Amplifier output node E is set to a high or low value. The voltage state of E is then transmitted by the Driver to node F which is connected to an NT Axon.

Figure 9:
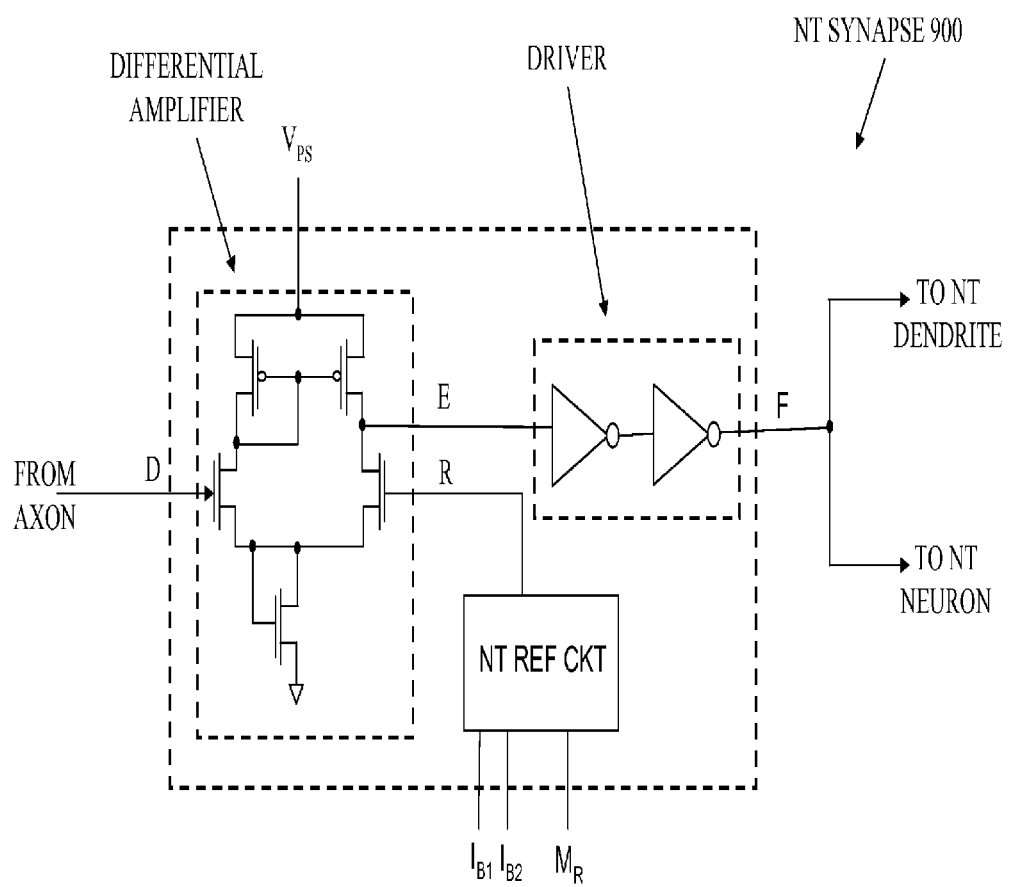
FIG. 9 illustrates a NT Synapse circuit with an Axon signal supplying an input, according to another embodiment.

FIG. 9 illustrates NT Synapse 900 with an Axon signal supplying the input. NT Synapse 900 is formed using a Differential Amplifier as was done in forming NT Neuron 800. NT Synapse 900 "fires" or does not "fire" depending on the difference in voltage between nodes D and R. Node E is set to a high or low voltage which is transmitted to output F by the Driver. Output F may be connected to an NT dendrite input and/or to a NT neuron input. Other NT Synapse circuits may be formed based on circuits similar to those used to form NT Neurons 500, 600, 700 as well. NT Axons may be formed using patterned Carbon Nanotube Fabrics or other conductors such as aluminum or copper for example.

Complex NT Neural Networks may be formed from the non-volatile analog and/or digital properties of combinations of the NT Dendrites, NT REF CKTs, NT Neurons, NT Axons, and NT Synapses described further above. Such networks may exhibit massive parallel processing capacity, learning behavior, etc. and thereby used to solve problems in fields such as pattern recognition, computing, etc.

Figure 10:
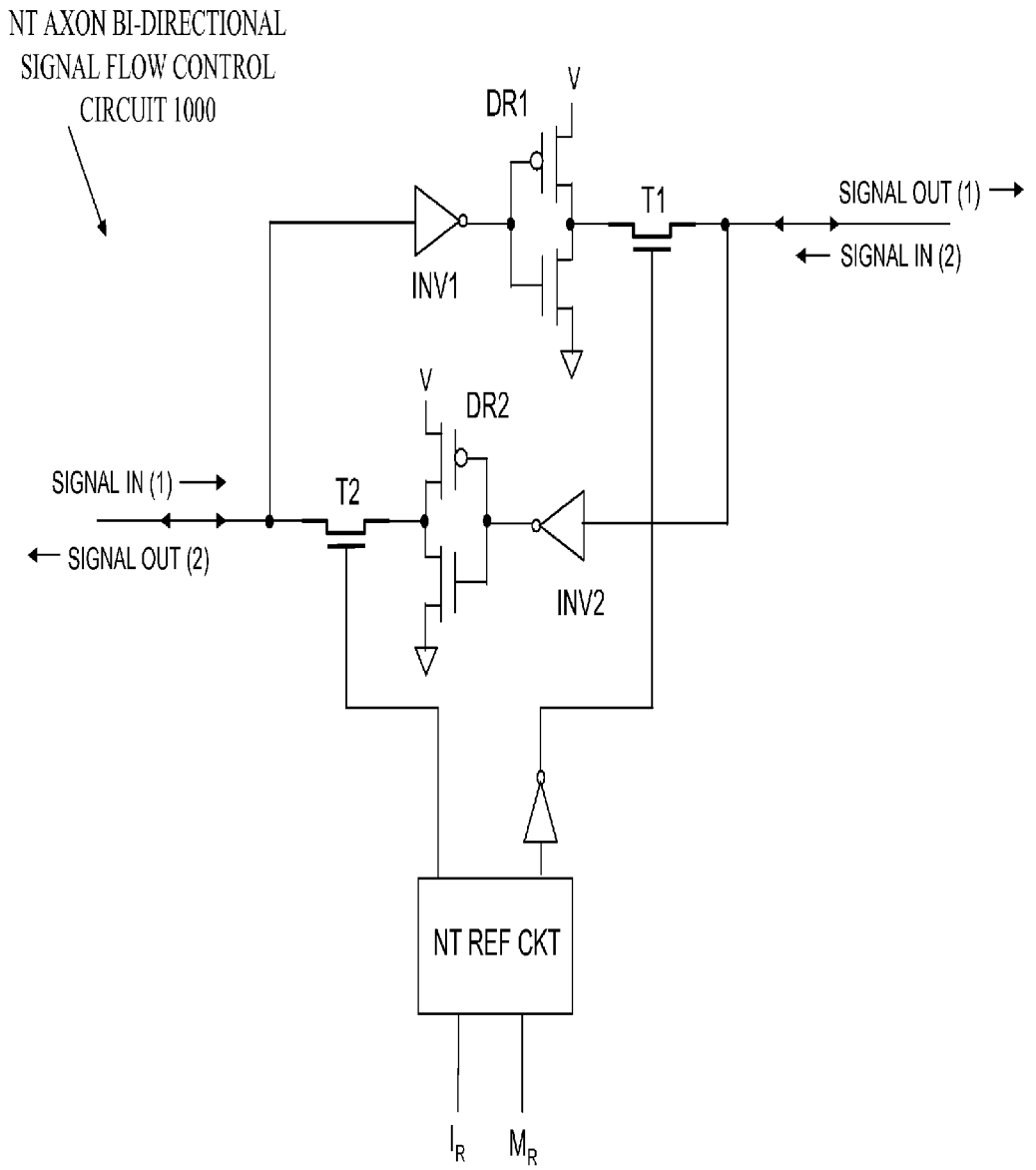
FIG. 10 illustrates NT Axon bidirectional signal flow control circuit according to another embodiment.

FIG. 10 illustrates NT Axon bidirectional signal flow control circuit 1000 for controlling signal flow direction within the axon. A bidirectional buffer circuit was modified by the addition of a NT REF CKT. The output states of the NT REF CKT control the direction of signal flow in the NT Axon by preferentially selecting signal flow (1) or signal flow (2). Signal flow (1) illustrated by signal in (1) and signal out (1) occurs if transistor (switch) T1 is ON and transistor (switch) T2 is OFF. Signal flow (2) illustrated by signal in (2) and signal out (2) occurs if transistor (switch) T1 is OFF and transistor (switch) T2 is ON. NT Axon bi-directional signal flow control circuit 1000 also restores signal characteristics (for example, pulse amplitude, rise and fall time, etc.). Specifically, the amplitude of the restored signal levels is equal to power supply V.

Figure 11:
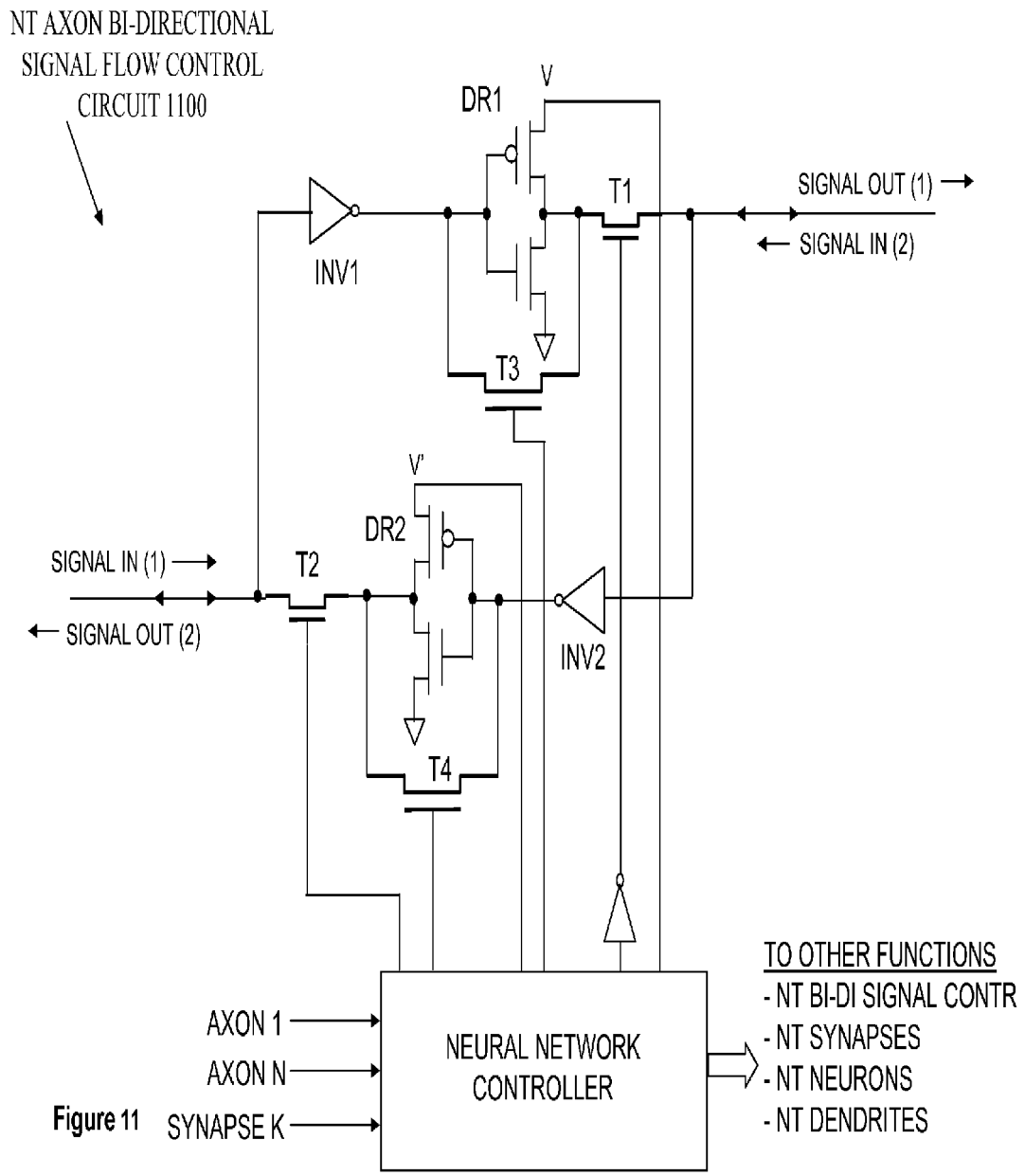
FIG. 11 illustrates NT Axon bidirectional signal flow control circuit, according to another embodiment.
Figure 12:
FIG. 12 is an illustration of various pulse options, according to another embodiment.
Figure 12:
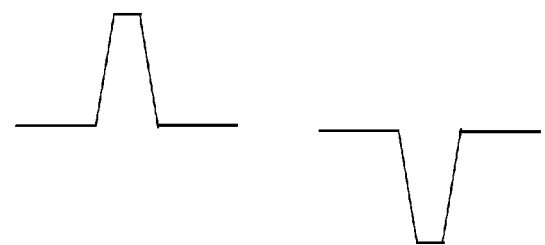
Figure 12:
Figure 12:
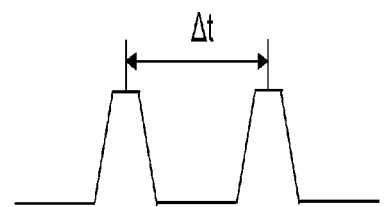

FIG. 11 illustrates NT Axon bidirectional signal flow control circuit 1100, which is a modification of NT Axon bidirectional signal flow control circuit 1000 with the NT REF CKT replaced by a Neural Network Controller similar to the Neural Network Controller illustrated in FIG. 3 and which also includes additional transistors (switches) T3 and T4 providing control over bias voltages V and V'. In this case the Neural Network Controller not only controls the direction of NT Axon signal flow by controlling the ON/OFF states of T1 and T2 as described in FIG. 10, but also controls the NT Axon signal polarity and amplitude as illustrated in FIG. 12 by Pulse Control Examples 1200. For example, if T1 is ON, T2 is OFF, and T3 is OFF, the signal in (1) is not inverted at the signal out (1) terminal; however, if T3 is ON bypassing driver DR1 then the signal out (1) is inverted. Alternatively, if T1 is OFF, T2 is ON, and T4 is OFF then the signal in (2) is not inverted at the signal out (2) terminal; however, if T4 is ON bypassing driver DR2, then the signal at the signal out 2 terminal is inverted. The Neural Network Controller may also control other NT Axon bidirectional controllers, etc. The operation of the Neural Network Controller is similar to the description with respect to FIG. 3 further above.

FIG. 12 is an illustration of various pulse options described with respect to FIGS. 10 and 11. A pulse temporal (timing) control function may be incorporated in FIG. 11 for example. Bertin et al. U.S. Pat. No. 6,177,807 Jan. 23, 2001 incorporated by reference teaches precise pulse timing control. Round trip times on transmission lines of precise lengths result in precise timing control of high speed (or any speed) functions. In addition, transmission line length is modulated using fuses placed at various physical locations along the transmission line to precisely program various trip times. The number of precision controlled pulse delays depends on the number of fuses; however once a fuse is "blown" the timing cannot be changed. NAN-109 incorporated by reference teaches substitution of NV NT switches for fuses (or antifuses). In this way timings can be changed without limit. In this manner pulse-to-pulse timing control may be incorporated (not shown) in the circuit illustrated in FIG. 11. In addition to pulse timing control, pulse rise and fall times can be automatically adjusted (or controlled by other circuits) as described in Bertin et al. U.S. Pat. No. 6,496,037 incorporated herein by reference in its entirety.

Figure 13:
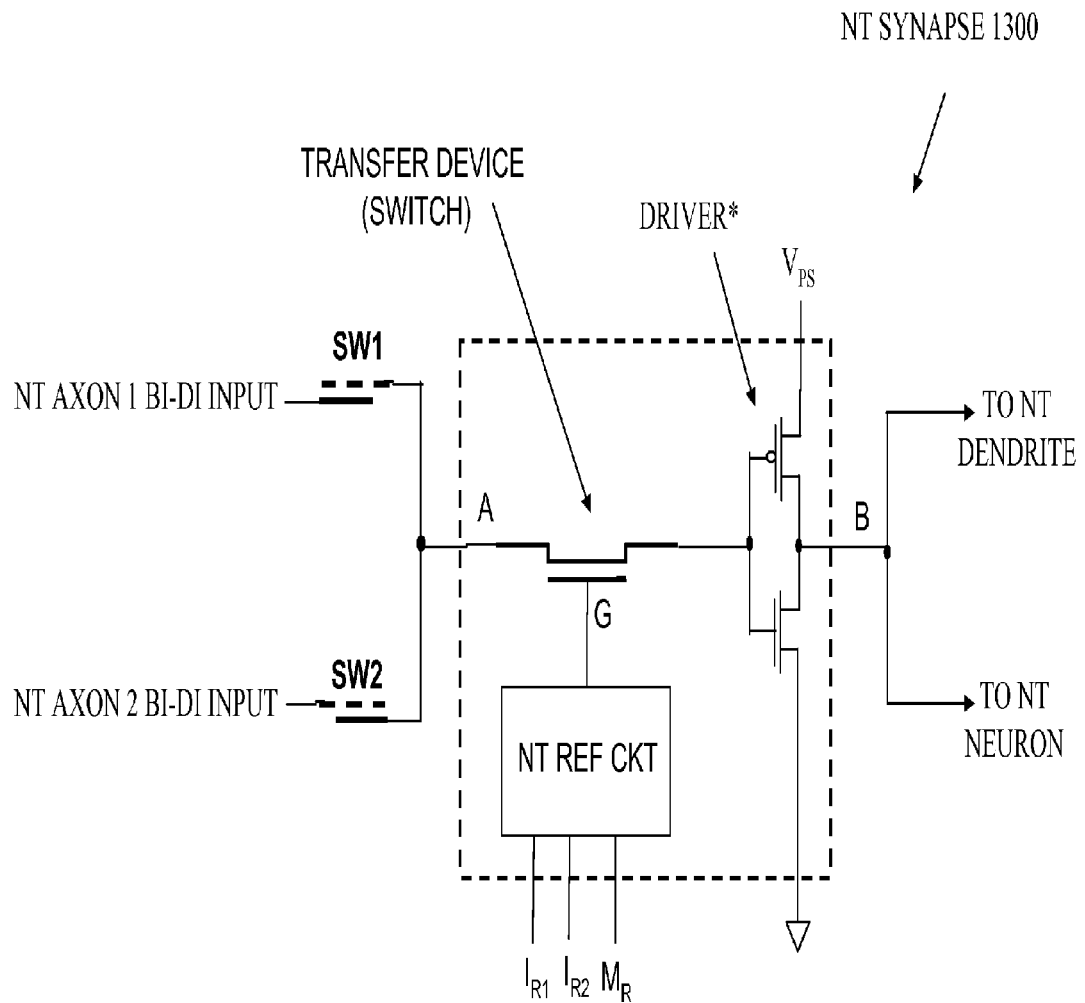
FIG. 13 illustrates pulse interference control at a NT Synapse circuit, according to another embodiment.

FIG. 13 illustrates pulse interference control at NT Synapse 1300. In this case, NT AXON 1 BI-DI INPUT A and NT AXON 2 BI-DI INPUT B are fed by SW1 and SW2 to a common node A. NT Synapse 1300 then propagates or does not propagate a signal at node A depending on a combination of the timing of the arrival of the pulses, the pulse amplitudes, and the pulse polarities. In this example, signal propagation also depends on the output state of the NT REG CKT; however, NT Synapse 1300 may be fabricated with a two-input NAND gate similar to that of NT Neuron 600 in FIG. 6 and thus respond only to inputs A and B. These conditions are set by Neural Network Controllers (or the same controller) for the two NT Axon inputs. In certain embodiments, signal propagation can be a function of pulse cancellation OR just control signal at gate G OR by embedded logic gate.

In other embodiments, the two NT axons may be connected directly to the NT synapse input node without going through the pair of NV NT switches illustrated in FIG. 13. NT AXON 1 BI-DI INPUT A and NT AXON 2 BI-DI INPUT B may be connected directly (not shown) to the NT synapse 1300 common node input without going through NV NT switches. Optionally, a termination may be used to minimize reflections in the NT axons. The termination (such as an impedance, for example) can be added (not shown) to the NT synapse 1300 common node input to minimize pulse reflections in NT AXON 1 BI-DI INPUT A and NT AXON 2 BI-DI INPUT B.

Figure 14:
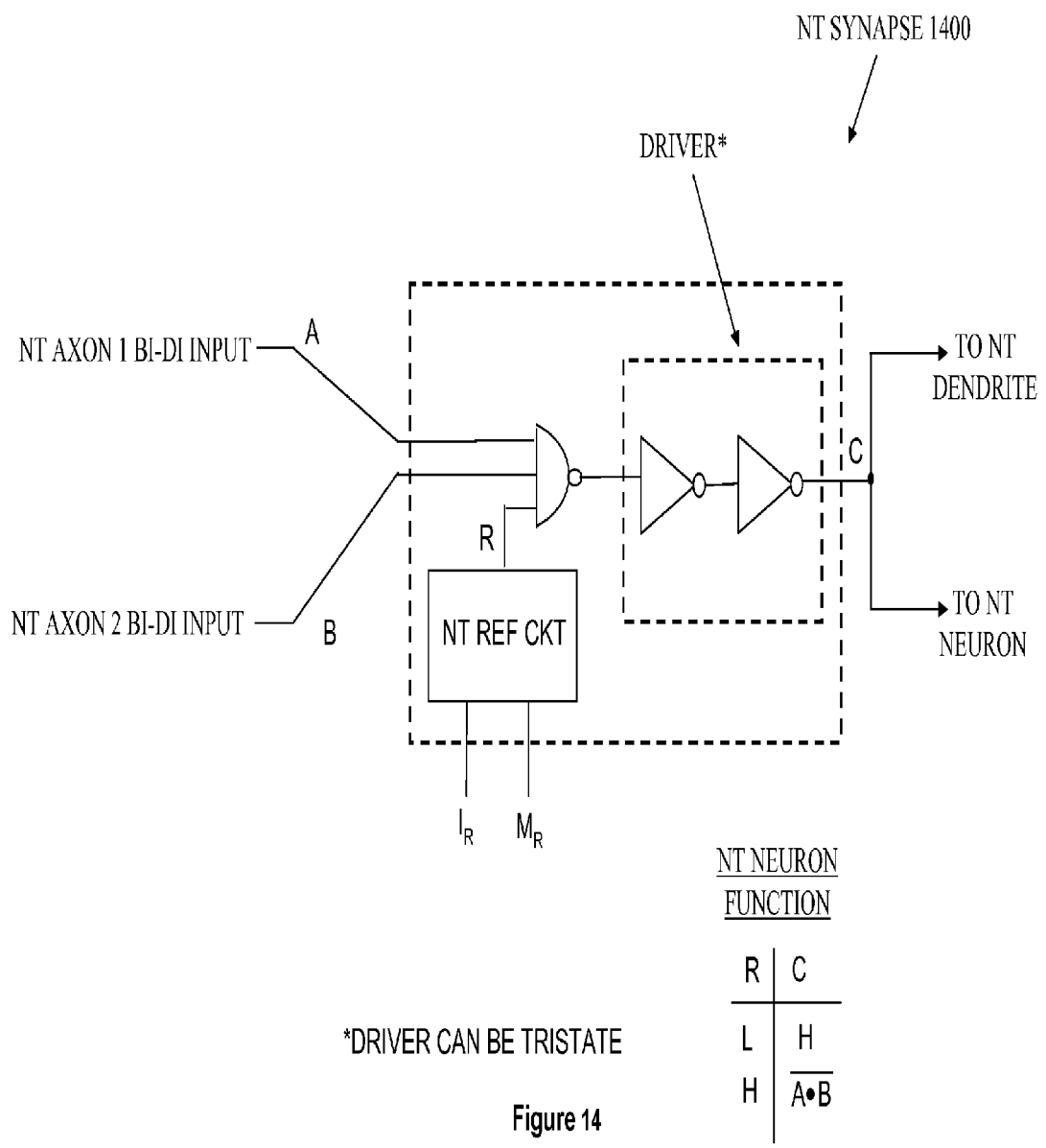
FIG. 14 illustrates pulse interference control at NT Synapse circuit, according to another embodiment.

FIG. 14 illustrates pulse interference control at NT Synapse 1400. In this case, NT AXON 1 BI-DI INPUT A and NT AXON 2 BI-DI INPUT B are two different inputs to a 3-input NAND gate at nodes A and B, respectively. NT Synapse 1400 then switches output state or does not switch output state depending on the timing of the arrival of the NT Axon signal characteristics (e.g. timing of arrival of pulses, pulse amplitudes, and pulse polarities). In this example, output state C also depends on the state of reference node R, set by the NT REG CKT; however, NT Synapse 1400 may be fabricated with a two input NAND gate similar to that of NT Neuron 600 in FIG. 6 and thus respond only to inputs A and B. The condition suitable for this embodiment are set by Neural Network Controllers (or the same controller) for the two NT Axon.

The invention may be embodied in other specific forms without departing from the spirit or essential characteristics thereof. The present embodiments are therefore to be considered in respects as illustrative and not restrictive.

The invention claimed is:

1. A physical neural network comprising:
   a dendrite circuit comprising two two-terminal non-volatile nanotube switches, wherein:
      the first and second terminals of each non-volatile switch are in contact with opposite ends of a patterned non-woven nanotube fabric;
      the second terminal of the first non-volatile nanotube switch and the second terminal of the second non-volatile nanotube switch share a common node; and
      the common node sums any input signals at the first terminals of the non-volatile switches.

2. The physical neural network of claim 1, wherein the resistance across the two terminals of each non-volatile nanotube switch varies in response to electrical stimulus applied to at least one of the first and second terminals of each non-volatile nanotube switch.

3. The physical neural network of claim 1, wherein the dendrite circuit further comprises a first semiconductor-type field effect transistor FET having a semiconductor drain region and a semiconductor source region of a first type of semiconductor material and a semiconductor channel region positioned between respective drain and source regions, said channel region made of a second type of semiconductor material, further having a gate node in proximity to the channel region so as to be able to modulate the conductivity of the channel region by electrically stimulating the gate, wherein the drain of the first semiconductor-type FET is connected to the common node.

4. The physical neural network of claim 3, wherein the dendrite circuit further comprises a second and third semiconductor-type FETs wherein:
   the first terminal of the first non-volatile nanotube switch is connected to the source or drain of the second semiconductor-type FET; and
   the first terminal of the second non-volatile nanotube switch is connected to the source or drain of the third semiconductor-type FET.

5. The physical neural network of claim 4, wherein the dendrite circuit further comprises control circuitry to provide electrical stimulus to control the resistance across the two terminals of each non-volatile nanotube switch.

6. A physical neural network comprising:
   a dendrite circuit comprising:
      five two-terminal non-volatile nanotube switches, wherein:
         the first and second terminals of each non-volatile switch are in contact with opposite ends of a patterned non-woven nanotube fabric;
         the second terminals of the non-volatile nanotube switches share a common node;
         the common node sums any input signals at the first terminals of the non-volatile switches; and
      a first semiconductor-type field effect transistor FET having a semiconductor drain region and a semiconductor source region of a first type of semiconductor material and a semiconductor channel region positioned between respective drain and source regions, said channel region made of a second type of semiconductor material, further having a gate node in proximity to the channel region so as to be able to modulate the conductivity of the channel region by electrically stimulating the gate, wherein the drain of the first semiconductor-type FET is connected to the common node.

7. A physical neural network comprising:
   a plurality of dendrite circuits, wherein each dendrite circuit comprises:
      at least one non-volatile nanotube switch, wherein:
         the at least one non-volatile switch comprises a plurality of terminals;
         a first terminal and a second terminal of the at least one nonvolatile switch are in contact with opposite ends of a patterned non-woven nanotube fabric; and
         the second terminal of the at least one non-volatile nanotube switch is coupled to a common node, wherein the common node sums the input signal at the first terminal of the at least one non-volatile switch; and
      a semiconductor-type field effect transistor FET having a semiconductor drain region and a semiconductor source region of a first type of semiconductor material and a semiconductor channel region positioned between respective drain and source regions, said channel region made of a second type of semiconductor material, further having a gate node in proximity to the channel region so as to be able to modulate the conductivity of the channel region by electrically stimulating the gate, wherein the drain of the semiconductor-type FET is connected to the common node; and a transfer circuit coupled to the common node of each dendrite circuit.

8. The physical neural network of claim 7, wherein the common node of each dendrite circuit is coupled to an intermediate node that sums any signals at the common nodes of each dendrite circuit; and the transfer circuit comprises:
   a three-terminal switch able to propagate the intermediate node signal to an output node; and
   a reference circuit able to modulate the switch and trigger a connection of input signals applied at the first terminal of the non-volatile nanotube switches to the output node.

9. The physical neural network of claim 8, wherein the three terminal switch is a semiconductor-type FET coupled to an output of the reference circuit and is triggered when the output of the reference circuit exceeds a voltage threshold.

10. The physical neural network of claim 8, wherein the reference circuit is set to a state in response to electrical stimulus and is able to hold the state after the electrical stimulus is removed.

11. The physical neural network of claim 7, wherein the transfer circuit comprises:
   a driver circuit;
   a reference circuit;
   a Boolean-logic circuit;
   wherein the output of the Boolean-logic circuit is coupled to the driver circuit input and each dendrite circuit common node is coupled to a different Boolean logic circuit input.

12. The physical neural network of claim 11, wherein the Boolean-logic circuit implements a NAND and the reference circuit is able to trigger the Boolean logic circuit when an output of the reference circuit exceeds a voltage threshold.

13. The physical neural network of claim 11, wherein the Boolean-logic circuit implements a NOR and the reference circuit is able to trigger the Boolean logic circuit when an output of the reference circuit exceeds a voltage threshold.

14. The physical neural network of claim 7, wherein the common node of each dendrite circuit is coupled to an intermediate node that sums any signals at the common nodes of each dendrite circuit; and
   the transfer circuit comprises:
      a differential amplifier, wherein the first differential amplifier input is coupled to the intermediate node;
      a reference circuit, wherein the common mode of the reference circuit is coupled to the second differential amplifier input; and
      a driver circuit coupled to the differential amplifier output.

15. A physical neural network comprising:
   a synapse circuit comprising:
   a transfer circuit;
   a driver circuit coupled to an output of the transfer circuit; and
   a reference circuit comprising at least one two-terminal non-volatile nanotube switch wherein:
      the first and second terminals of the at least one non-volatile switch are in contact with opposite ends of a patterned non-woven nanotube fabric;
      the second terminal of the at least one non-volatile nanotube switch is coupled to a common node; and
      the common node sums any input signals at the first terminal of the at least one non-volatile switch.

16. The physical neural network of claim 15, wherein the transfer circuit comprises a differential amplifier;
   a reference circuit output is coupled to a first input of the differential amplifier; and
   the output of the differential amplifier is enabled based on the difference between the voltage at the reference circuit output and the voltage at a second input of the differential amplifier.

17. The physical neural network of claim 15, wherein the transfer circuit comprises a three-terminal switch having a first terminal, a second terminal coupled to the driver circuit and a control terminal coupled to a reference circuit output;
   the reference circuit is able to trigger a connection between signals applied at the first terminal and the output node when output of the reference circuit exceeds a voltage threshold.

18. The physical neural network of claim 15, wherein the transfer circuit comprises a Boolean-logic circuit coupled to the driver circuit; and
   the reference circuit is able to trigger the Boolean-logic circuit when an output of the reference circuit exceeds a voltage threshold.

19. A physical neural network comprising:
   an axon bidirectional signal flow control unit comprising:
      a bidirectional buffer circuit; and
      a reference circuit comprising at least one two-terminal non-volatile nanotube switch wherein:
         the first and second terminals of the at least one non-volatile switch are in contact with opposite ends of a patterned non-woven nanotube fabric;
         the second terminal of the at least one non-volatile nanotube switch is coupled to a common node;
         the common node sums any input signals at the first terminal of the at least one non-volatile switch; and
         wherein the direction of signal flow in the control unit is selected by the reference circuit.

* * * * *